United States Patent
Fung et al.

(10) Patent No.: US 9,156,944 B2
(45) Date of Patent: Oct. 13, 2015

(54) PROCESS FOR PRODUCING POLYPHENYLENE ETHER HELPING TO IMPROVE SAFETY AND YIELD

(71) Applicant: NAN YA PLASTICS CORPORATION, Taipei (TW)

(72) Inventors: Dein-Run Fung, Taipei (TW); Jung-Jen Chuang, Taipei (TW); Yi-Cheng Li, Taipei (TW); Zhang-Jian Huang, Taipei (TW)

(73) Assignee: NAN YA PLASTICS CORPORATION, Taipei (TW)

(*) Notice: Subject to any disclaimer, the term of this patent is extended or adjusted under 35 U.S.C. 154(b) by 0 days.

(21) Appl. No.: 14/539,224

(22) Filed: Nov. 12, 2014

(65) Prior Publication Data

US 2015/0141610 A1    May 21, 2015

(30) Foreign Application Priority Data

Nov. 21, 2013    (TW) .............................. 102142410 A

(51) Int. Cl.
*C08G 63/02* (2006.01)
*C08G 65/38* (2006.01)

(52) U.S. Cl.
CPC ...................................... *C08G 65/38* (2013.01)

(58) Field of Classification Search
USPC ..................... 528/86, 88, 212, 214, 215, 217; 366/220, 314, 316, 331, 322
See application file for complete search history.

(56) References Cited

U.S. PATENT DOCUMENTS

2002/0042494 A1*    4/2002    Braat et al. .................... 528/217

FOREIGN PATENT DOCUMENTS

SU                967268        * 10/1982

* cited by examiner

*Primary Examiner* — Terressa Boykin
(74) *Attorney, Agent, or Firm* — Bacon & Thomas, PLLC

(57) ABSTRACT

A process for producing polyphenylene ether involves to keep a combustible solvent at a gaseous concentration below the minimums of explosion, to keep oxygen gas supplied at a gaseous concentration below the limiting oxygen concentration (LOC) of the solvent, and to make use of a reactor having a rotary-sealed mixer sealed with magnetic rotary feedthroughs to prevent static electricity generated, and then to improve safety and yield thereof.

7 Claims, 2 Drawing Sheets

PROCESS FOR PRODUCING POLYPHENYLENE ETHER HELPING TO IMPROVE SAFETY AND YIELD

BACKGROUND OF THE INVENTION

1. Field of the Invention

The present invention relates to preparation of polyphenylene ether, and more particularly to a process for producing polyphenylene ether to improve safety and yield thereof.

2. Description of Related Art

Polyphenylene ether (PPE) is a polymer mainly contained of benzene rings and formed by benzene molecules and oxygen atoms combined with ether linkages. PPE has good thermal and mechanical stability, and its coefficients of thermal expansion, formation compressibility and creep as well as water absorption are all low. These properties contribute to excellent processability and formability. PPE also possesses outstanding electrical properties due to its low dielectric loss and good insulating quality. Over wide ranges of temperature, frequency and humidity, its dielectric constant and dissipation factor almost remain unchanged, so PPE has great dielectric performance.

Conventionally, polyphenylene ether (PPE) is made by oxidizing and polymerizing carbon atoms and oxygen atoms of 2,6-dimethylphenol (2,6-DMP) and oxygen ($O_2$) in the presence of an organic solvent and a coordination complex catalyst formed by copper and amine. Additionally, when 2,6-DMP is co-polymerized with a phenolic compound having functional groups, a desired modification of 2,6-DMP can be achieved to further improve PPE's property. For example, 2,6-DMP and a bisphenol can be co-polymerized to form a bisphenol-modified 2,6-DMP at its two terminals having OH functional groups, wherein the bisphenol is tetramethylbisphenol-A (TMBPA), tetramethylbisphenol-F (TMBPF), tetramethylbiphenol (TMBP) or 4-bromo-2,6-dimethylphenol (BDMP). Alternatively, 2,6-DMP can be co-polymerized with alkenyl phenol to form an alkenyl phenol-modified 2,6-DMP that has alkenyl functional groups, wherein the alkenyl phenol is 2-allyl-6-methylphenol (AMP) or 2-butenyl-6-methylphenol (BMP).

The reaction for forming PPE has to be performed in the presence of oxygen, an organic solvent such as toluene or alcohol solvent and a catalyst. Therein, o oxygen is known as a combustion-supporting gas or agent, and the organic solvent is a combustible material, while the processing equipment tends to produce static electricity, which acts as an igniter. In other words, the conventional PPE preparation involves all three essentials of combustion, i.e. a combustion-supporting agent, a combustible material and an igniter. If the process is not properly designed, the reaction for producing PPE is very dangerous and highly explosive.

For prevention of explosion, a known approach controls the combustible organic solvent kept its gaseous concentration below the minimums of explosion thereof to eliminate explosive factors associated with the combustible. Additionally, the reaction equipment of producing PPE is mainly designed to prevent from generation of static electricity (i.e. the igniter).

However, for gain a high yield of PPE, pure oxygen or oxygen regarded as a combustion-supporting agent is used at a high concentration even going beyond the limiting oxygen concentration (abbreviated as LOC) of relative reaction solvent thereof. Accordingly, the whole process for producing PPE still has a persistent risk factor from the combustion-supporting agent thereof.

As shown in FIG. 1, in a known oxidation polymerization process for producing PPE (abbreviated as PPE-producing process), an apparatus implemented has an oxidation-polymerization reactor 10, provided therein with a traditional impeller mixing device 20. The impeller mixing device 20 uses a rotatory shaft 21 to drive vanes 22 at the terminal of the rotatory shaft 21 to rotate and thereby stir a solution of PPE (abbreviated as PPE reactant) 30. While the vanes 22 rotate, an oxygen nozzle 60 immersed in the PPE reactant 30 may introduce a high-pressure oxygen gas into the PPE reactant 30, so that the rotating vanes 22 promote the contact between oxygen gas and the PPE reactant 30, making the PPE reactant 30 get an oxidation polymerization in the presence of the oxygen gas and a catalyst, thereby obtaining the desired PPE.

Since the supplied oxygen is not effectively contacted with the PPE reactant 30, and the catalyst in use is a copper-amine complex, water is generated during process for producing the PPE and degrades the reaction. Consequently, the resultant PPE yield is too low to support industrial manufacturing. Especially, for preventing explosion, the whole PPE-producing process is performed under a low-oxygen condition, which brings further limitation to the PPE yield. Besides, the traditional impeller mixing device 20 uses a mechanical seal on the rotatory shaft 21, and tends to cause leakage of oxygen and generation of static electricity, making the production of PPE highly dangerous.

SUMMARY OF THE INVENTION

The present invention discloses a process for producing polyphenylene ether (PPE) helping to improve safety and yield thereof, wherein oxygen gas or air regarded as a combustion-supporting agent must use at a gaseous concentration below the limiting oxygen concentration (LOC) of the involved solvent to help the entire PPE-producing reaction to become much safer.

The process for producing PPE is much safer and more productive by implementing the following technical features:

1. An oxidation-polymerization reactor is selectively equipped with a rotary-sealed mixer sealed with magnetic rotary feedthroughs, and the mixer has gas-introducing, gas-exhausting and stirring functions. With oxidization and polymerization performed under an environment having a lower oxygen concentration, the contact between oxygen and the reactant is improved, thereby increasing the yield of PPE; and 2. a copper-amine complex-based catalyst containing a $C_1$-$C_6$ alcohol, a surfactant and a copper-amine complex is used as an catalyst required to gain a more effective and more stable oxidization and polymerization.

A process for producing polyphenylene ether helping to improve safety and yield, comprising the steps of a) preparing an oxidation-polymerization reactor containing therein a rotary-sealed mixer;

b) forming a PPE reactant in the oxidation-polymerization reactor by mixing 2,6-DMP, bisphenol-modified 2,6-DMP or alkenyl phenol-modified 2,6-DMP with an organic solvent selected from the group consisting of toluene, methanol, ethanol, propyl alcohol and butanol solvent;

c) adding a copper-amine complex-based catalyst into the PPE reactant by weight ratio of 2,6-DMP to copper ions ranging from 500 to 5,000, wherein the copper-amine complex-based catalyst is formed from a $C_1$-$C_6$ alcohol, a surfactant and a copper-amine complex by weight ratio of $C_1$-$C_6$ alcohol to copper ions ranging from 5 to 1,000 and surfactant to copper ions ranging from 1 to 200 respectively; and the $C_1$-$C_6$ alcohol is derived from methanol, ethanol, propyl alcohol, butanol, amyl alcohol, hexyl alcohol, or a combination thereof.

d) introducing oxygen gas at a gaseous concentration below the limiting oxygen concentration (LOC) of the solvent of step b), or optionally introducing additional nitrogen gas as an inert gas;

e) activating the rotary-sealed mixer of step a) to distribute oxygen gas evenly over the PPE reactant;

f) making the PPE reactant get an oxidation polymerization to obtain PPE crude products under pressure ranging from 2 to 60 kg/cm$^2$ and temperature ranging from −10° C. to 80° C. for from 0.5 to 16 hours; and g) processing the PPE crude product via extracting out copper ions and removing the solvent to obtain PPE products.

DETAILED DESCRIPTION OF THE INVENTION

Figure 1:
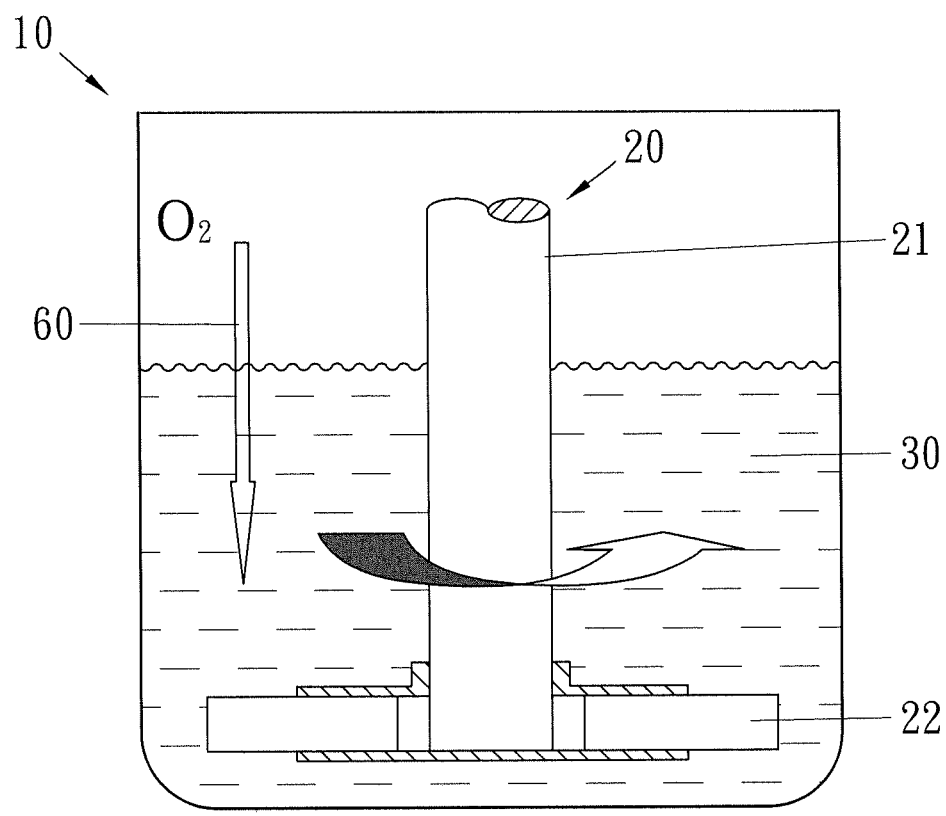
FIG. 1 schematically depicts a traditional oxidation-polymerization reactor conventionally used for producing PPE.
Figure 2:
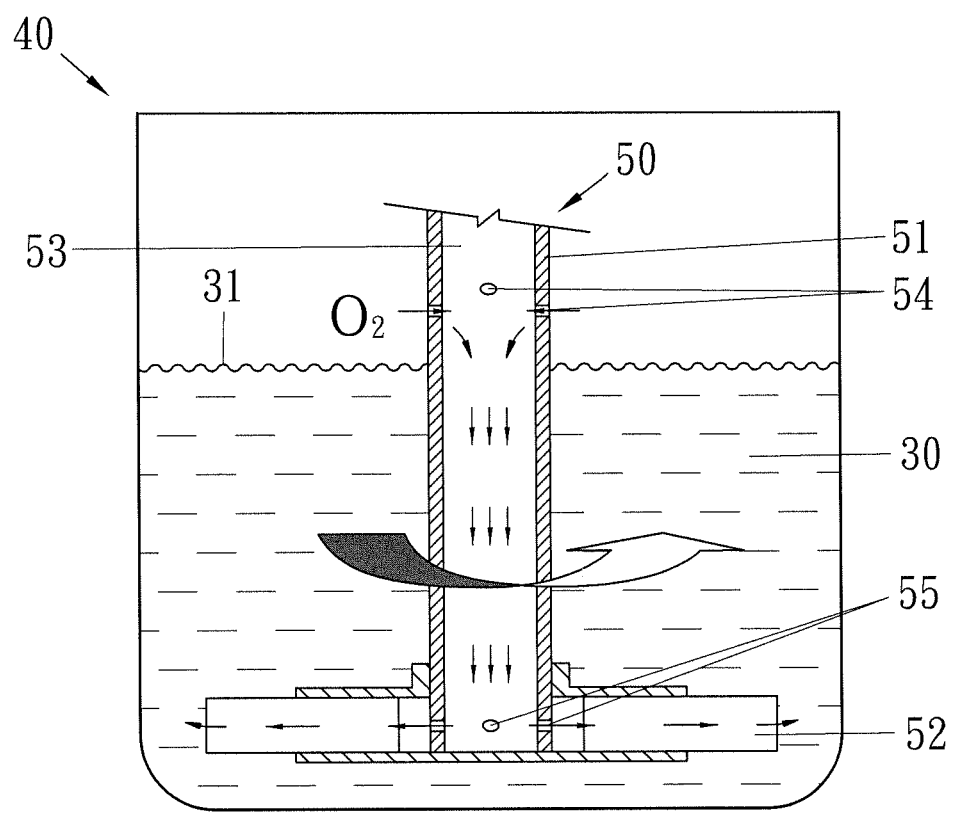
FIG. 2 schematically depicts the oxidation-polymerization reactor according to the present invention.

Referring to FIG. 2, a process for producing polyphenylene ether (PPE) of the present invention in the course of reaction involves to keep a gaseous concentration of a combustible solvent below the minimums of explosion, to supply oxygen gas (known as combustion-supporting agent) kept at a gaseous concentration lower than the limiting oxygen concentration (LOC) of an organic solvent, and to make use of an oxidation-polymerization reactor 40 equipped with a rotary-sealed mixer 50 sealed with magnetic rotary feedthroughs as well as having gas-introducing, gas-exhausting and stirring functions to prevent from generation of static electricity and improve the efficiency of oxidization.

The disclosed process for producing polyphenylene ether (PPE) reduces the risk of explosion regardless of three essentials for combustion (namely, a combustion-supporting agent, a combustible and an igniter) all presented in PPE-producing process, thereby making the preparation of PPE become much safer and more productive.

1. Improvement in Reaction Equipment:

The rotary-sealed mixer 50 installed in the oxidation-polymerization reactor 40 of the present invention has gas-introducing, gas-exhausting and stirring functions, which structurally comprises a hollow rotatory shaft 51 and vanes 52 attached to a terminal of the hollow rotatory shaft 51. The hollow rotatory shaft 51 is internally formed as a gas channel 53, for delivering oxygen gas (or air). The hollow rotatory shaft 51 at its upper part has several air-extracting holes 54 communicated with the gas channel 53. In use, the air-extracting holes 54 are located above a liquid surface 31 of PPE reactant 30 in advance poured into the reactor 40, so that the oxygen gas can be drawn into the gas channel 53. The hollow rotatory shaft 51 at its lower part further has several air-exhausting holes 55 also communicated with the gas channel 53, for allowing the oxygen gas drawn into the gas channel 53 to be exhausted out from the air-exhausting holes 55.

In a low limiting oxygen concentration (LOC) environment, the reactor 40 of the present invention uses the rotary-sealed mixer 50 to make oxygen (or air) contact with the PPE reactant 30 more effectively, thereby accelerating oxidization and polymerization as well as improving the PPE yield. Particularly, the rotary-sealed mixer 50 is sealed with magnetic rotary feedthroughs to prevent from leakage of oxygen and generation of static electricity, and in turn to ensure the safety of the entire PPE-producing reaction.

2. Improvement in Catalyst:

The disclosed PPE-producing process involves using a copper-amine complex-based catalyst, which catalyst contains a $C_1$-$C_6$ alcohol, a surfactant and a copper-amine complex. Therein, the weight ratio of $C_1$-$C_6$ alcohol to copper ions ranges from about 5 to 1,000, and the weight ratio of the surfactant to copper ions ranges from about 1 to 200. Moreover, the PPE reactant 30 for the PPE-producing reaction has a weight ratio of 2,6-DMP to copper ions ranges from about 500 to 5,000.

The $C_1$-$C_6$ alcohol and the copper-amine complex both contain amines having short carbon chains, so they have similar three-dimensional structures, and have similar OH functional groups as well as amino groups. With the presence of the $C_1$-$C_6$ alcohol, the copper-amine complex is structurally enhanced. In the intended PPE-producing reaction, the $C_1$-$C_6$ alcohol is helpful to prevent water from being produced during the reaction of the copper-amine complex-based catalyst, so as to effectively improve the efficiency and stability of oxidization and polymerization for making PPE. By comparison, $C_7$ alcohols have long carbon chains and large three-dimensional structures, so is less favorable to the desired reactivity and stability.

The copper-amine complex contains copper ions derived from cuprous chloride, copper chloride, cuprous bromide, copper bromide, cuprous oxide, or a combination thereof.

The copper-amine complex contains an amine selected from the group consisting of primary, secondary and tertiary amines and combinations thereof, including n-butylamine, n-dibutylamine and dibutyl-ethylenediamine, etc.

The copper-amine complex contains halide ion selected from the group consisting of hydrochloric acid, hydrobromic acid, cuprous chloride, copper chloride, cuprous bromide, copper bromide, 4-bromo-2,6-dimethylphenol, hydrogen chloride and hydrogen bromide.

The copper-amine complex-based catalyst contains the $C_1$-$C_6$ alcohol derived from methanol, ethanol, propyl alcohol, butanol, amyl alcohol, hexyl alcohol, or a combination thereof.

The surfactant is a positive-ion surfactant, a negative-ion surfactant, a non-ion surfactant, a positive-ion plus non-ion surfactant or a negative-ion plus non-ion surfactant. The positive-ion surfactant may be amine salts and ammonium salts, such as ACETAMINE 24, ACETAMINE 86, QUARTAMIN 24P, QUARTAMIN 86P, QUARTAMIN 86W, SANISOL C, SANISOL B-50, AMPHITOL 20BS, or AMPHITOL 20N from Kao Chemicals; or such as B8879, 13373, B5042, 40163, 17104, H5882, M7379, 91042, H9151, or G900 from Sigama Aldrich.

The negative-ion surfactant may be carboxylic salts, sulphonic acid salts, and sulphates of alcohols, such as PC-10 from Sanyo Chemical Industries, Ltd.; MS-2N from Sino-Japan Chemical Co., Ltd.; OS SOAP, EMAL 2F PASTE, EMAL TD, EMAL AD-25R, LATEMUL PS, LATEMUL ASK, SS-40N, FR-25, EMAL 71, NEOPELEX F-25, PELEX TA, or ELEC F from Kao Chemicals; L5901, 71736, 75746, L3771, 71717, 86350, B2013, 51832, 81806, P0299, 30960, G6132, 30970, T7515, T0512, D1685, or L5000 from Sigama Aldrich, and so on.

The non-ionic surfactant is in the form of —O— or —OH, and may be poly (ethylene oxide) derivatives, such as EMULGEN 104P, EMULGEN 105, EMULGEN 106, EMULGEN 404, EMULGEN 409P, EMULGEN LS-106, EMULGEN MS-110, EMULGEN A-60, EMULGEN A-90, EMASOL L-10(F), RHEODOL TW-5120, or AMINON PK-02S from Kao Chemicals; or such as M7521, P9532, 16005, 16011, 93171, 40108, 61028, 238562, 15502, D6277, P9641, 74680, 30887, P1300, 93774, 16186, T1135, 15S30, NP7, 90450, or D5172 from Sigama Aldrich.

3. Limitation on Solvent:

In the disclosed PPE-producing process, the solvent is an organic solvent selected from the group consisting of toluene, methanol, ethanol, propyl alcohol and butanol, which has physical properties that do not negatively affect the activity of the copper-amine complex-based catalyst, do not produce side products when reacting with 2,6-DMP, and has a stable viscosity that do not negatively affect oxidization and polymerization.

Those solvents have the physical properties given in Table 1 below. Where the solvent is made by mixing with two or more solvents, the lowest value of the minimums of explosion and the lowest value of the limiting oxygen concentration (LOC) among the used solvents are intentionally chosen.

TABLE 1

| Item | | | Solvent | | | | |
|---|---|---|---|---|---|---|---|
| | | | Toluene | Methanol | Ethanol | Propyl Alcohol | Butanol |
| 1 | Air's minimums of explosion | w/w % | 1.1 | 7.3 | 3.1 | 2.0 | 1.4 |
| 2 | Air's maximums of explosion | w/w % | 7.1 | 36.0 | 19.0 | 13.7 | 12.0 |
| 3 | Pure Oxygen's minimums of explosion | w/w % | 1.1 | 7.3 | 3.1 | 2.0 | 1.4 |
| 4 | Pure Oxygen's maximums of explosion | w/w % | 38.0 | 82.0 | 68.1 | 63.0 | 56.0 |
| 5 | Limiting Oxygen Concentration (LOC) | w/w % | 9.9 | 10.0 | 9.8 | 9.1 | 8.6 |

From Table 1, a toluene solvent taken as a reaction solvent has a limiting oxygen concentration (LOC) of 9.9%, resulted in that in the course of PPE-producing process the parameter for the combustible toluene solvent has to be set at a gaseous concentration below the minimums of explosion thereof, namely 1.1%. The limiting oxygen concentration (LOC) of oxygen (like a combustion-supporting agent) has to be set below 9.9%.

Likewise, a methanol solvent taken as a reaction solvent has a LOC of 10.0%, resulted in that in the course of PPE-producing process the parameter for the combustible methanol solvent has to be set at a gaseous concentration below the minimums of explosion thereof, namely 7.3%. The limiting oxygen concentration (LOC) of oxygen has to be set below 10.0%.

When the used solvent is ethanol, propyl alcohol or butane solvent whose boiling point is higher than that of methanol solvent, the corresponding parameter for each combustible solvent should be set at a gaseous concentration below the minimums of explosion respectively, and the concentration of oxygen (like combustion-supporting agent) supplied to corresponding PPE reactant is set below corresponding limiting oxygen concentration (LOC) for each solvent thereof.

To ensure the safety throughout the PPE-producing process, the oxidation-polymerization reactor 40 of the present invention has to use the rotary-sealed mixer 50 to prevent from generation of static electricity and to supply sufficient oxygen successfully reacted with PPE reactant 30. Furthermore, the used catalyst is the copper-amine complex-based catalyst due to containing the $C_1$-$C_6$ alcohol and the surfactant to support the safety and yield of the PPE-producing reaction.

Due to the aforementioned three essentials (a combustion-supporting agent, a combustible and an igniter) for combustion being eliminated, when the reaction for forming PPE is undergone with the presence of the copper-amine complex-based catalyst to allow of the PPE reactant 30 successfully reacted with desired oxygen being continuously supplied from the rotary-sealed mixer 50, the PPE-producing reaction is become much safer and a high yield of the PPE crude product can be obtained. The obtained crude product is then processed with an aqueous solution of a chelating agent to extract copper ions, and a high-yield PPE product is obtained after the solvent is removed. The chelating agent used is selected from ethylenediaminetetraacetic acid or nitrilotriacetic acid, or in each case, a salt thereof.

As shown in FIG. 2, the process for producing polyphenylene ether (PPE) of the present invention helping to improve safety and yield is achieved by performing the following steps:

a) preparing an oxidation-polymerization reactor 40 containing therein a rotary-sealed mixer 50 provided with gas-introducing, gas-exhausting and stirring functions;

b) forming a PPE reactant 30 in the oxidation-polymerization reactor 40 by mixing 2,6-DMP, bisphenol-modified 2,6-DMP or alkenyl phenol-modified 2,6-DMP with a reaction solvent;
   wherein the solvent is toluene, methanol, ethanol, propyl alcohol or butanol solvent; the bisphenol-modified 2,6-DMP is formed from 2,6-DMP co-polymerized with a bisphenol selected from TMBPA, TMBPF, TMBP or BDMP; and the alkenyl phenol-modified 2,6-DMP is formed from 2,6-DMP co-polymerized with alkenyl phenol selected from AMP or BMP;

c) adding a copper-amine complex-based catalyst into the PPE reactant by weight ratio of 2,6-DMP to copper ions ranging from 500 to 5,000, wherein the copper-amine complex-based catalyst is formed from a $C_1$-$C_6$ alcohol, a surfactant and a copper-amine complex by weight ratio of $C_1$-$C_6$ alcohol to copper ions ranging from 5 to 1,000 and surfactant to copper ions ranging from 1 to 200 respectively;

d) introducing oxygen gas at a gaseous concentration below the limiting oxygen concentration (LOC) of the reaction solvent of step b), or optionally introducing an additional nitrogen gas as an inert gas;

e) activating the rotary-sealed mixer 50 to distribute oxygen evenly over the PPE reactant 30;

f) making the PPE reactant 30 get an oxidation polymerization under a processing pressure ranging from 2 to 60 kg/cm$^2$, at an reacted temperature ranging from $-10°$ C. to 80° C., and for a reaction duration ranging from 0.5 to 16 hours; and g) processing the PPE crude product via extracting out copper ions and removing the solvent to obtain a high-yield PPE product.

The following Examples and Comparative Examples are provided for illustrating and demonstrating the effects of the present invention, it is to be noted that the scope of the present invention is not limited to the recited Examples.

Preparing Copper-Amine Complex A1-A6 Containing No $C_1$-$C_6$ Alcohols and Surfactants:

Source of copper ions is obtained from cuprous chloride (CuCl, CAS number 7758-89-6), copper chloride (CuCl2, CAS number 7447-39-4), cuprous bromide (CuBr, CAS number 54678-23-8), copper bromide (CuBr2, CAS number 7789-45-9) or cuprous oxide ($Cu_2O$, CAS number 1317-39-1).

Source of amine is obtained from butylamine ($C_4H_{11}N$, CAS Number 109-73-9), n,n-dimethylbutylamine ($C_6H_{15}N$, CAS Number 927-62-8), di-butylamine ($C_{81}H_{19}N$, CAS number 111-92-2) or n,n'-di-tert-butylethylenediamine ($C_{10}H_{24}N_2$, CAS number 4062-60-6).

Source of halide ions is obtained from hydrochloric acid 37% solution (37% HCl(aq) or CAS number 7647-01-0) or hydrobromic acid 48% solution (48% HBr(aq), CAS number 10035-10-6)

Copper-amine complex A1-A6 containing no $C_1$-$C_6$ alcohols and surfactants are prepared by following the compositions listed in Table 2A respectively.

TABLE 2A

| composition | Item copper-amine complex | | | | | |
|---|---|---|---|---|---|---|
| | A1 | A2 | A3 | A4 | A5 | A6 |
| CuCl (g) | 0.0225 | 0 | 0 | 0 | 0 | 0 |
| CuCl$_2$ (g) | 0 | 0.0225 | 0 | 0 | 0 | 0 |
| CuBr (g) | 0 | 0 | 0.0225 | 0 | 0 | 0 |
| CuBr$_2$ (g) | 0 | 0 | 0 | 0.0225 | 0 | 0 |
| Cu$_2$O (g) | 0 | 0 | 0 | 0 | 0.0225 | 0.0225 |
| 37% HCl$_{(aq)}$ (g) | 0 | 0 | 0 | 0 | 0.032 | 0 |
| 48% HBr$_{(aq)}$ (g) | 0 | 0 | 0 | 0 | 0 | 0.028 |
| C$_4$H$_{11}$N (g) | | | | 0.320 | | |
| C$_6$H$_{15}$N (g) | | | | 0.602 | | |
| C$_8$H$_{19}$N (g) | | | | 0.213 | | |
| C$_{10}$H$_{24}$N$_2$ (g) | | | | 0.058 | | |
| Total Weight (g) | 1.215 | 1.215 | 1.215 | 1.215 | 1.247 | 1.243 |

Preparing Copper-Amine Complex-Based Catalysts B1-B6:

Following the compositions listed in Table 2B, $C_1$-$C_6$ alcohols, surfactant and pre-formulated copper-amine complex A1-A6 were placed into glass beakers which are subsequently vibrated at room temperature of 25° C. for 30 minutes in an ultrasonic vibrator, thereby copper-amine complex-based catalysts B1-B6 containing the $C_1$-$C_6$ alcohols, the surfactant and the copper-amine complex A1-A6 are obtained.

TABLE 2B

| composition | Item Copper-amine complex-based catalyst | | | | | |
|---|---|---|---|---|---|---|
| | B1 | B2 | B3 | B4 | B5 | B6 |
| C$_1$-C$_6$ alcohols (g) | methanol (0.5) | ethanol (0.5) | propyl alcohol (1.0) | butanol (1.0) | amyl alcohol (5.0) | hexyl alcohol (5.0) |
| Surfactant (g) | positive ion (0.04) | negative ion (0.10) | non-ion (0.28) | positive ion (0.41) | negative ion (0.68) | non-ion (0.92) |
| Copper-Amine Complex (g) | A1 (1.215) | A2 (1.215) | A3 (1.215) | A4 (1.215) | A5 (1.247) | A6 (1.243) |
| Total Weight (g) | 1.755 | 1.815 | 2.495 | 2.625 | 6.927 | 7.163 |

Examples 1-12

From Table 3, different amounts of 2,6-DMP, TMBPA, AMP, BMP or/and BDMP were weighed as reactants, and mixed the reactants with corresponding solvents into different PPE reactants. The reactants were put into a 300-ml oxidation-polymerization reactor that is equipped with a rotary-sealed mixer having gas-introducing, gas-exhausting and stirring functions, and pre-formulated copper-amine complex-based catalysts B1-B6 were added.

Nitrogen and oxygen gas were continuously introduced into the oxidation-polymerization reactor. From Table 3, oxygen gases were set at a gaseous concentration below the limiting oxygen concentration (LOC) of corresponding reaction solvent thereof, where pressure is kept at 6 kg/cm$^2$ and temperature is maintained at 25° C. Then the rotary-sealed mixer was activated for PPE oxidization and polymerization. The reaction was terminated after 2 hours from its beginning and PPE crude products were obtained.

After the PPE crude products were cooled to room temperature, 2 times of the solvents were added to dilute the concentration and viscosity of PPE. Then 0.1% ethylenediaminetetraacetic acid (EDTA, CAS number 60-00-4) aqueous solution was used as a chelating agent for removing copper ions by means of extraction. After the aqueous phase was separated, methanol was used to isolate PPE. After filtering and drying is completed, PPE products were obtained.

The PPE products were measured for their molecular weights and weighed, and the PPE yields are also determined. The results are shown in Table 3.

TABLE 3

| composition | Item Examples | | | | | |
|---|---|---|---|---|---|---|
| | 1 | 2 | 3 | 4 | 5 | 6 |
| catalyst | B1 | B2 | B3 | B4 | B5 | B6 |
| oxidation-polymerization reactor | | | rotary-sealed mixer | | | |
| 2,6-DMP (g) | 15 | 15 | 15 | 15 | 15 | 15 |
| TMBPA (g) | 0 | 0 | 0 | 0 | 0 | 0 |

TABLE 3-continued

| | | | | | | |
|---|---|---|---|---|---|---|
| AMP (g) | 0 | 3.2 | 0 | 3.2 | 0 | 0 |
| BMP (g) | 0 | 0 | 0 | 0 | 0 | 3.8 |
| BDMP (g) | 0 | 0 | 0.2 | 0 | 0 | 0.15 |
| Reaction Solvent (100 g) | toluene | toluene | methanol | methanol | ethanol | ethanol |
| LOC (w/w %) | 9.9 | 9.9 | 10.0 | 10.0 | 9.8 | 9.8 |
| oxygen concentration at reactor top (%) | 7.2 | 7.2 | 7.8 | 7.8 | 7.3 | 7.3 |
| PPE Product | | | | | | |
| PPE molecular weight (g/mol) | 22,971 | 19,794 | 2,539 | 3,241 | 2,818 | 4,743 |
| PPE Yield (%) | 98.3 | 96.2 | 99.3 | 97.7 | 98.5 | 95.6 |

| | Item Examples | | | | | |
|---|---|---|---|---|---|---|
| composition | 7 | 8 | 9 | 10 | 11 | 12 |
| catalyst | B1 | B2 | B3 | B4 | B5 | B6 |
| oxidation-polymerization reactor | | | rotary-sealed mixer | | | |
| 2,6-DMP (g) | 15 | 15 | 15 | 15 | 15 | 15 |
| TMBPA (g) | 0 | 0 | 0 | 1.5 | 1.5 | 0 |
| AMP (g) | 0 | 0 | 0 | 0 | 0 | 3.2 |
| BMP (g) | 0 | 3.8 | 0 | 0 | 0 | 0 |
| BDMP (g) | 0.15 | 0 | 0 | 0.2 | 0 | 0 |
| Reaction Solvent (100 g) | propyl alcohol | propyl alcohol | butanol | butanol | methanol | butanol |
| LOC (w/w %) | 9.1 | 9.1 | 8.6 | 8.6 | 10.0 | 8.6 |
| oxygen concentration at reactor top (%) | 7.0 | 7.0 | 7.0 | 7.0 | 7.8 | 7.0 |
| PPE Product | | | | | | |
| PPE molecular weight (g/mol) | 3,625 | 5,837 | 4,650 | 4,986 | 2,641 | 6,174 |
| PPE Yield (%) | 98.4 | 98.0 | 98.3 | 99.5 | 97.8 | 98.3 |

Comparative Examples 1-12

From Table 4, the processes for producing PPE is almost same as Examples 1-12, except that copper-amine complex A1-A6 containing no $C_1$-$C_6$ alcohols and surfactants were used as catalysts and the oxidation-polymerization reactor is equipped with a traditional impeller mixing device.

The PPE products were measured for their molecular weights and weighed, and the PPE yields were also determined. The results are shown in Table 4.

TABLE 4

| | Item Comparative Examples | | | | | |
|---|---|---|---|---|---|---|
| composition | 1 | 2 | 3 | 4 | 5 | 6 |
| catalyst | A1 | A2 | A3 | A4 | A5 | A6 |
| oxidation-polymerization reactor | | | traditional impeller mixing device | | | |
| 2,6-DMP (g) | 15 | 15 | 15 | 15 | 15 | 15 |
| TMBPA (g) | 0 | 0 | 0 | 0 | 0 | 0 |
| AMP (g) | 0 | 3.2 | 0 | 3.2 | 0 | 3.2 |
| BMP (g) | 0 | 0 | 0 | 0 | 0 | 3.8 g |
| BDMP (g) | 0 | 0 | 0.2 | 0 | 0 | 0.15 |
| Reaction Solvent (100 g) | toluene | toluene | methanol | methanol | ethanol | ethanol |
| LOC (w/w %) | 9.9 | 9.9 | 10.0 | 10.0 | 9.8 | 9.8 |
| oxygen concentration at reactor top (%) | 7.2 | 7.2 | 7.8 | 7.8 | 7.3 | 7.3 |
| PPE Product | | | | | | |
| PPE molecular weight (g/mol) | colloid | colloid | 2,561 | 3,073 | 2,782 | 4,239 |
| PPE Yield (%) | 0.0 | 0.0 | 42.3 | 37.7 | 54.7 | 58.5 |

TABLE 4-continued

| composition | Item Comparative Examples | | | | | |
|---|---|---|---|---|---|---|
| | 7 | 8 | 9 | 10 | 11 | 12 |
| catalyst | A1 | A2 | A3 | A4 | A5 | A6 |
| oxidation-polymerization reactor | traditional impeller mixing device | | | | | |
| 2,6-DMP (g) | 15 | 15 | 15 | 15 | 15 | 15 |
| TMBPA (g) | 0 | 0 | 0 | 1.5 | 1.5 | 0 |
| AMP (g) | 0 | 3.2 | 0 | 0 | 0 | 3.2 |
| BMP (g) | 0 | 3.8 | 0 | 0 | 0 | 0 |
| BDMP (g) | 0.15 | 0 | 0 | 0.2 | 0 | 0 |
| Reaction Solvent (100 g) | propyl alcohol | propyl alcohol | butanol | butanol | methanol | butanol |
| LOC (w/w %) | 9.1 | 9.1 | 8.6 | 8.6 | 10.0 | 8.6 |
| oxygen concentration at reactor top (%) | 7.0 | 7.0 | 7.0 | 7.0 | 7.8 | 7.0 |
| PPE Product | | | | | | |
| PPE molecular weight (g/mol) | 3,541 | 5,624 | 4,563 | 4,813 | 2,714 | 6,041 |
| PPE Yield (%) | 61.4 | 57.9 | 31.4 | 41.8 | 38.7 | 78.4 |

CONCLUSION

1. As learned from Examples 1-12, when the reactant is 2,6-DMP solely or may be a mixture of 2,6-DMP and TMBPA, AMP, BMP or BDMP, with the reactive conditions meeting the following requirements R1-R4, the PPE-producing reaction is become much safer and the PPE yield can be as high as 95.6-99.5%:

R1. a gaseous concentration of reaction solvent suited for PPE-producing reaction should be set below the minimums of explosion thereof; when a reaction solvent is formed by mixing with two or more solvents, the parameters regarding both concentration and LOC of the reaction solvent should be set below the lowest minimums among those mixed solvents thereof;

R2. a desired gaseous concentration of oxygen introduced during PPE-producing reaction should be set below the limiting oxygen concentration (LOC) of corresponding reaction solvent;

R3. a copper-amine complex-based catalyst formed from a $C_1$-$C_6$ alcohol, a surfactant and a copper-amine complex is in favor of PPE-producing reaction; and R4. a rotary-sealed mixer 50 is suited to prevent from leakage of oxygen and generation of static electricity, and to ensure the process for producing PPE become much safer and more productive.

2. In comparison with Comparative Examples 1-12, it is learned that an oxidation-polymerization reactor if equipped with a known traditional impeller mixing device thereof and/or copper-amine complex A1-A6 containing no $C_1$-$C_6$ alcohols and surfactant if chosen as catalysts for PPE-producing reaction is adverse to the PPE yield, wherein the highest yield of PPE product shown in Comparative Example 12 is 78.4% only.

What is claimed is:

1. A process for producing polyphenylene ether helping to improve safety and yield, comprising the steps of
   a) preparing an oxidation-polymerization reactor containing therein a rotary-sealed mixer having gas-introducing, gas-exhausting and stirring functions as well as sealed with magnetic rotary feedthroughs to prevent from generation of static electricity;
   b) forming a PPE reactant in the oxidation-polymerization reactor by mixing 2,6-dimethylphenol (2,6-DMP), bisphenol-modified 2,6-DMP or alkenyl phenol-modified 2,6-DMP with an organic solvent selected from the group consisting of toluene, methanol, ethanol, propyl alcohol and butanol solvent; wherein the used organic solvent is set at a gaseous concentration below the minimums of explosion thereof;
   c) adding a copper-amine complex-based catalyst into the PPE reactant by weight ratio of 2,6-DMP to copper ions of the catalyst ranging from 500 to 5,000, wherein the copper-amine complex-based catalyst is formed from a $C_1$-$C_6$ alcohol, a surfactant and a copper-amine complex by weight ratio of $C_1$-$C_6$ alcohol to copper ions ranging from 5 to 1,000 and surfactant to copper ions ranging from 1 to 200 respectively; and the $C_1$-$C_6$ alcohol is derived from methanol, ethanol, propyl alcohol, butanol, amyl alcohol, hexyl alcohol, or a combination thereof;
   d) introducing pure oxygen gas or air at a gaseous concentration below the limiting oxygen concentration (LOC) of the used organic solvent of step b), or optionally introducing additional nitrogen gas as an inert gas;
   e) activating the rotary-sealed mixer of step a) to distribute oxygen gas evenly over the PPE reactant;
   f) making the PPE reactant get an oxidation polymerization to obtain PPE crude products under pressure ranging from 2 to 60 kg/cm$^2$ and temperature ranging from −10° C. to 80° C. for from 0.5 to 16 hours; and
   g) processing the PPE crude product via extracting out copper ions and removing the solvent to obtain PPE products.

2. The process for producing polyphenylene ether of claim 1, wherein the catalyst of step c) contains an amine selected from a group consisting of primary, secondary, tertiary amines and combinations thereof.

3. The process for producing polyphenylene ether of claim 1, wherein the catalyst of step c) contains copper ions derived from cuprous chloride, copper chloride, cuprous bromide, copper bromide, cuprous oxide, or a combination thereof.

4. The process for producing polyphenylene ether of claim 1, wherein the catalyst contains an amine selected from a group consisting of primary, secondary and tertiary amines and combinations thereof, and copper ions derived from cuprous chloride, copper chloride, cuprous bromide, copper bromide, cuprous oxide, or a combination thereof.

5. The process for producing polyphenylene ether of claim 1, wherein the bisphenol-modified 2,6-DMP of step b) is formed from a 2,6-xylenol and a bisphenol being co-polymerized for modifying the polyphenylene ether, and wherein the bisphenol is tetramethylbisphenol-A, tetramethylbisphenol-F, tetramethylbiphenol or 4-bromo-2,6-dimethylphenol.

6. The process for producing polyphenylene ether of claim 1, wherein the alkenyl phenol-modified 2,6-DMP of step b) is formed from a 2,6-xylenol and an alkenyl phenol being co-polymerized for modifying the polyphenylene ether, and wherein the alkenyl phenol is 2-allyl-6-methylphenol or 2-butenyl-6-methylphenol.

7. The process for producing polyphenylene ether of claim 1, wherein at step g) an aqueous solution of a chelating agent selected from ethylenediaminetetraacetic acid or nitrilotriacetic acid is used to extract copper ions.

* * * * *